United States Patent [19]
Lin

[11] Patent Number: 5,244,320
[45] Date of Patent: Sep. 14, 1993

[54] WOOD TAPPING MACHINE

[76] Inventor: Jeff Lin, 1F, No. 85-6, Ning-Han St., Hsi-Tun Dist., Taichung City, Taiwan

[21] Appl. No.: 962,831

[22] Filed: Oct. 19, 1992

[51] Int. Cl.⁵ .............................. B23C 3/32; B23G 3/08
[52] U.S. Cl. .................................... 409/76; 409/71; 409/72; 409/65; 142/1
[58] Field of Search ..................... 409/72, 65, 71, 75, 409/76; 142/1

[56] References Cited

U.S. PATENT DOCUMENTS

| | | | |
|---|---|---|---|
| 771,106 | 9/1904 | Wackenhuth | 409/76 |
| 2,268,078 | 12/1941 | McCurdy | 409/76 |
| 2,286,477 | 6/1942 | Falls | 409/71 |
| 3,704,648 | 12/1972 | Burfoot | 409/76 |
| 4,585,378 | 4/1986 | Carter | 409/76 |
| 4,750,849 | 6/1988 | Phillips | 409/71 |

FOREIGN PATENT DOCUMENTS 0114352 of 1918 United Kingdom .................. 409/76

OTHER PUBLICATIONS

Threaded Lid Boxes, Steven Gray, Fine Woodworking Aug. 1992, pp. 76–79.

*Primary Examiner*—Mark Rosenbaum
*Assistant Examiner*—Erik R. Puknys
*Attorney, Agent, or Firm*—Sandler Greenblum & Bernstein

[57] ABSTRACT

A wood tapping machine includes a cutting device formed on a machine body which has a tapping rod extending horizontally from the cutting device. A guiding path is formed on the machine body and has a toolrest which is disposed slidably thereon. The toolrest includes a base member and a cylindrical casing that has two arms extending therefrom and connected pivotally to the base member. A driving rod connects the base member and the cylindrical casing and maintains the cylindrical casing parallel to the tapping rod of the cutting device. The cylindrical casing can swing relative to the base member when the driving rod rotates about its axis. A main shaft is threadedly and rotatably disposed through the cylindrical casing. The main shaft has a chuck assembly at one end and a rotation wheel at another end thereof.

2 Claims, 8 Drawing Sheets

WOOD TAPPING MACHINE

BACKGROUND OF THE INVENTION

1. FIELD OF INVENTION

This invention relates to a wood tapping machine, more particularly to one which includes a cutting device with a tapping rod so that said tapping machine can form threads on or in a piece of wood.

2. DESCRIPTION OF THE RELATED ART

A conventional wood tapping machine comprises a machine body having a headstock with a cutting device, a guiding path disposed on the machine body and a toolrest slidably provided on the guiding path. The cutting device is usually rotated by a motor. A drawback of the conventional wood tapping machine is that though it can cut, shave and shape a piece of wood, it can not form threads on and/or in the piece of wood. After the pieces of wood are cut and shaped into the desired configuration, they are nailed together so as to form furniture. The nailing procedure results in damage to the pieces of wood.

SUMMARY OF THE INVENTION

It is a main object of the present invention to provide a wood tapping machine which includes a cutting device with a tapping rod so that threads can be formed externally or internally of a piece of wood.

Another object of the present invention is to provide a wood tapping machine that includes a toolrest on which a cylindrical casing is mounted, which, in turn, carries a chuck assembly to clamp a piece of wood. The chuck assembly can swing within a predetermined angular range so that threads of various depths can be formed on said piece of wood.

According to the present invention, the wood tapping machine includes a machine body on which a cutting device with a tapping rod is mounted. A guiding path is mounted on the machine body and is parallel to and lower than the tapping rod of the cutting device. A base member is movably provided on the guiding path and has two spaced first arms which extend in a direction transverse to the guiding path. A first connecting rod, which has a transverse threaded through-bore passing therethrough, is journalled between the two first arms of the base member. A cylindrical casing is disposed above the base member and has two opposed ends from which two second arms respectively extend and connect pivotally to the base member. A second connecting rod is journalled between the two second arms and is parallel to and adjacent to the cylindrical casing. The second connecting rod has a transverse second threaded through-bore which passes through the axis of the second connecting rod. A driving rod has a threaded portion which extends threadedly through the first and second threaded through-bores of the first and second connecting rods, thereby maintaining the axis of the cylindrical casing parallel to the tapping rod of the cutting device. The cylindrical casing has a first inner wall which is provided with an internal thread. A main shaft has an external thread and is threadedly sleeved through the cylindrical casing such that the two ends thereof extend out of the casing. A chuck assembly is provided at one end of the main shaft, which one end is nearer to the tapping rod of the cutting device, and a rotation wheel is provided at the other end of the main shaft. When the driving rod rotates about its axis in a clockwise direction, the second arms of the cylindrical casing pivot relative to the base member in a first direction to a first angle. When the driving rod rotates about its axis in a counter clockwise direction, the second arms of the cylindrical casing pivot relative to the base member in a second direction opposite to the first direction to a second angle.

BRIEF DESCRIPTION OF THE DRAWINGS

Other features and advantages of the present invention will become more apparent in the following detailed description, including drawings, all of which show a non-limiting form of the present invention, in which.

DETAILED DESCRIPTION OF THE PREFERRED EMBODIMENT

Figure 1:
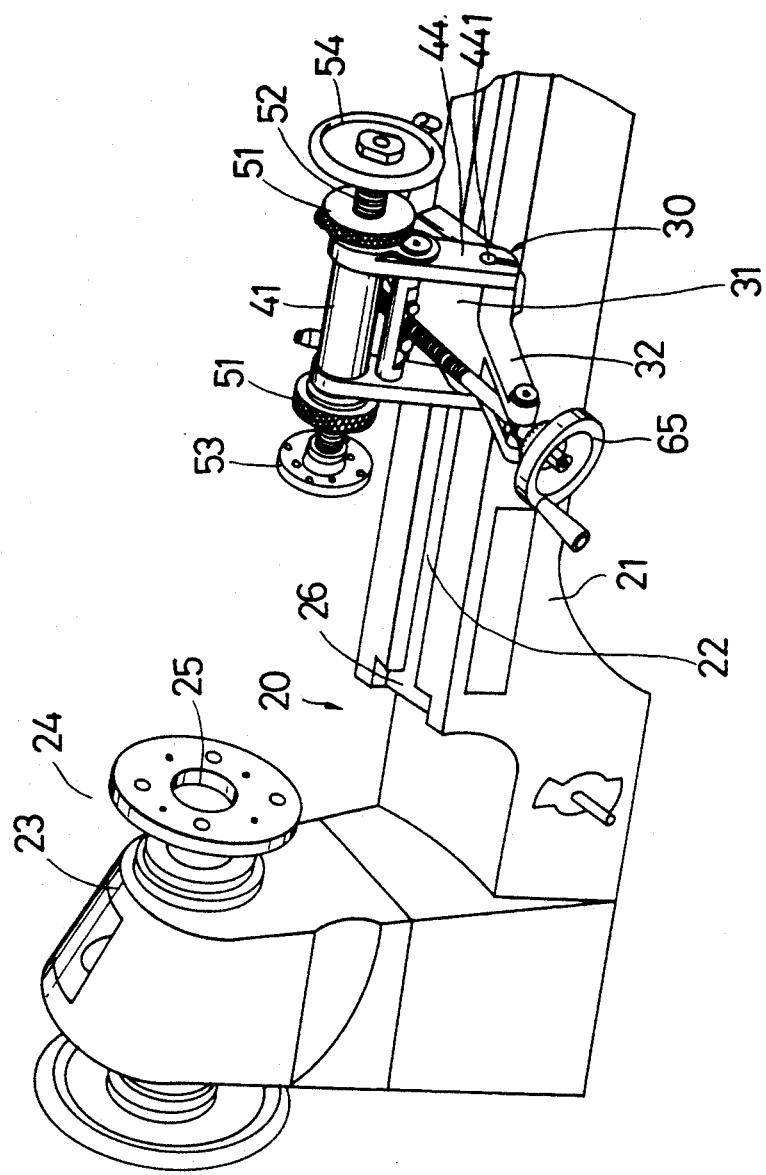
FIG. 1 is a perspective, schematic view of a wood tapping machine of the present invention.
Figure 2:
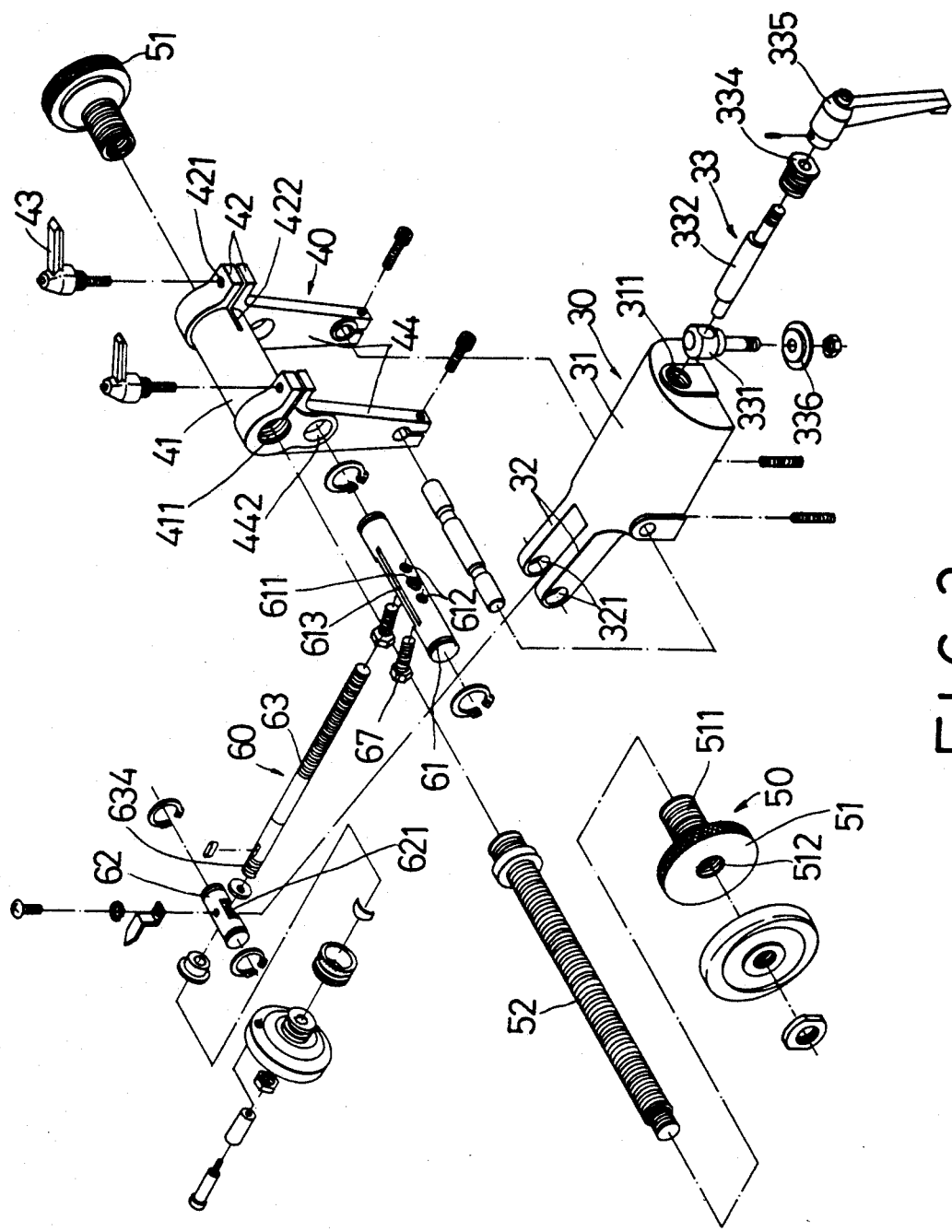
FIG. 2 is an exploded view of the wood tapping machine of FIG. 1.

Referring to FIGS. 1 and 2, a wood tapping machine of the present invention is shown to comprise a machine body (20), a cutting device (24) mounted on the machine body (20) at one end thereof, a guiding path (22), and a toolrest (30) movably mounted on the guiding path (22).

The cutting device (23) includes a tapping rod (25) with a tapping end (24) extending horizontally therefrom. The guiding path (22) is disposed on the machine body (20) and is parallel to and lower than the tapping rod (25) of the cutting device (24).

The toolrest (30) includes a base member (31) movably provided on the guiding path (22). An elongated groove (26) is formed through the machine body (20) and is communicated with the guiding path (22). The base member (31) has two first arms (32), which are spaced from one another and which extend in a direction transverse to the guiding path (22), and a threaded blind bore (311). A first connecting rod (62) has a first threaded-bore which extends transverse to the axis of the rod (62) and is journalled between the two first arms (32) of the base member (31). A locking unit (33) is journalled in the threaded blind bore (311) of the base member (31) and includes an eccentric shaft (332), a locking bolt (331) rotatably sleeved on the eccentric shaft (332), a fixing plate (336) provided below the machine body (20) and attached to a free end of the locking bolt (331), and a handle (335) attached securely to the eccentric shaft (332) through a bearing (334). After the base member (31) is moved to a desired position on the guiding path (22), the handle (335) can be rotated, thereby lifting the fixing plate (336) upward so as to abut the machine body (20) and position clampingly the base member (31).

A cylindrical casing (41) has two opposed ends from which two second arms (44) respectively extend and pivotally connect to the base member (32). The cylindrical casing (41) defines an inner wall provided with an internal thread and an axial slit (422) formed through the wall. A pair of clamps (42) are provided at two opposed ends of the cylindrical casing (41), the purpose of which will be described later. A second connecting rod (61) has an axial slit (611) and a second threaded-bore (613) which is transverse to the axis of the second connecting rod (61). The second connecting rod (61) is journalled between the second arms (44) adjacent to and parallel to the axis of the cylindrical casing (41). The second connecting rod (61) further includes two additional threaded-holes (612) which are similarly transverse to the axis of the second connecting rod (61) and which are parallel to the second threaded-bore (613).

A driving rod (60) with a threaded portion (63) extends threadedly through the first and second threaded-bores (621, 612) of the first and second connecting rods (62, 61), thereby maintaining the axis of the cylindrical casing (41) parallel to the tapping rod (25) of the cutting device (23). A rotation wheel (65) is attached securely to a free end of the driving rod (60). A degree indicator (61) is also provided on the driving rod (60) to indicate the angular rotation of the wheel (65) about its axis. When a pair of locking screws (67) are screwed into the additional threaded-holes (612) of the first connecting rod (61), the axial slit (613) is compressed so as to engage frictionally the threaded portion (63) of the driving rod (60) in the first threaded-bore (611) of the first connecting rod (61).

Each of a pair of guiding tubes (50) has an outwardly extending flange (51), an internal threaded-bore (512) and an external thread (511). The guiding tubes (50) are threaded in the two opposed ends of the cylindrical casing (41). A pair of locking bolts (43) threadedly engage in the clamp (42), thereby pressing two free ends of the clamp (42) toward each other. The axial slit (422) of the cylindrical casing (41) is correspondingly compressed so as to engage the guiding tubes (50) in the cylindrical casing (41). The clearance between the two free ends of each clamp (42) and the axial slit (422) of the cylindrical casing (41) are communicated with one another and cooperatively facilitate the assembly and disassembly of the guiding tubes (50) in the cylindrical casing (41).

A main shaft (52) extends threadedly through the guiding tubes (50) such that the two ends of the main shaft (52) respectively extend out from the guiding tubes (50). A chuck assembly (53), which is used for carrying a piece of wood, is fixed to a first end of the main shaft (52), while a rotation wheel (54) is fixed to a second end of the main shaft (52).

Figure 3:
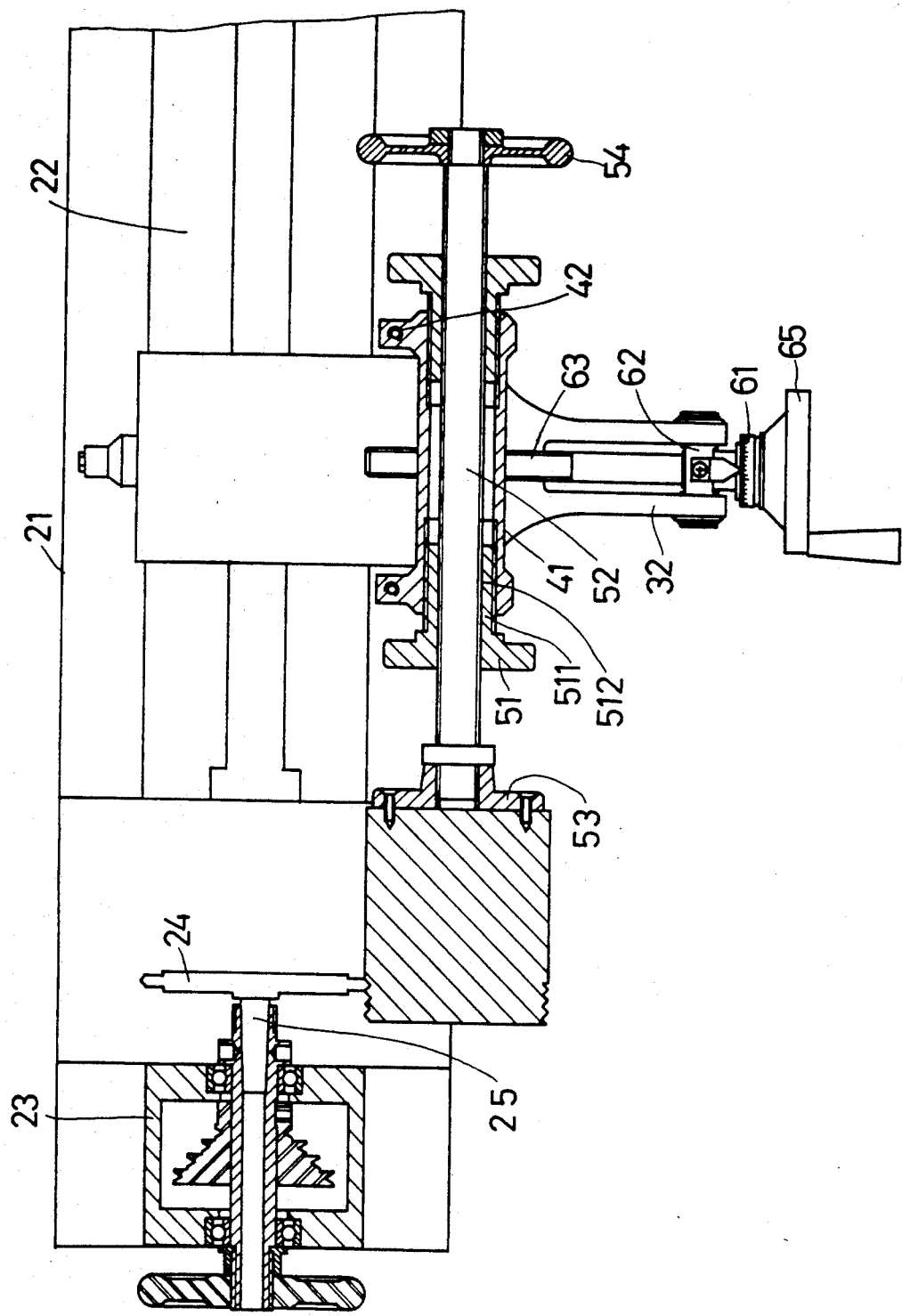
FIG. 3 shows a partially cross-sectional view of the wood tapping machine of the present invention.
Figure 4:
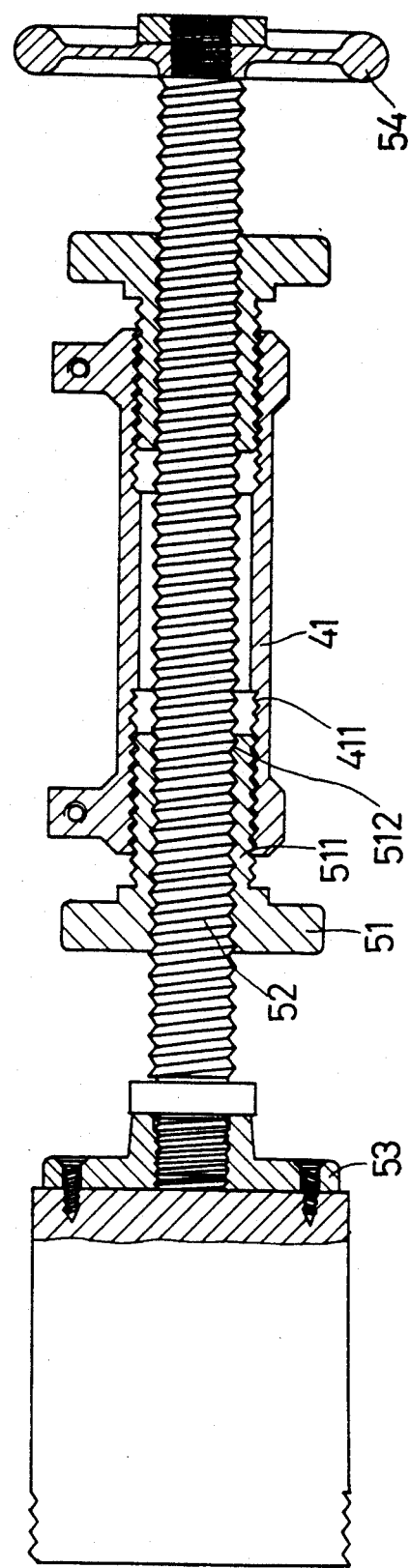
FIG. 4 shows an enlarged view of a portion of the wood tapping machine of the present invention.
Figure 5:
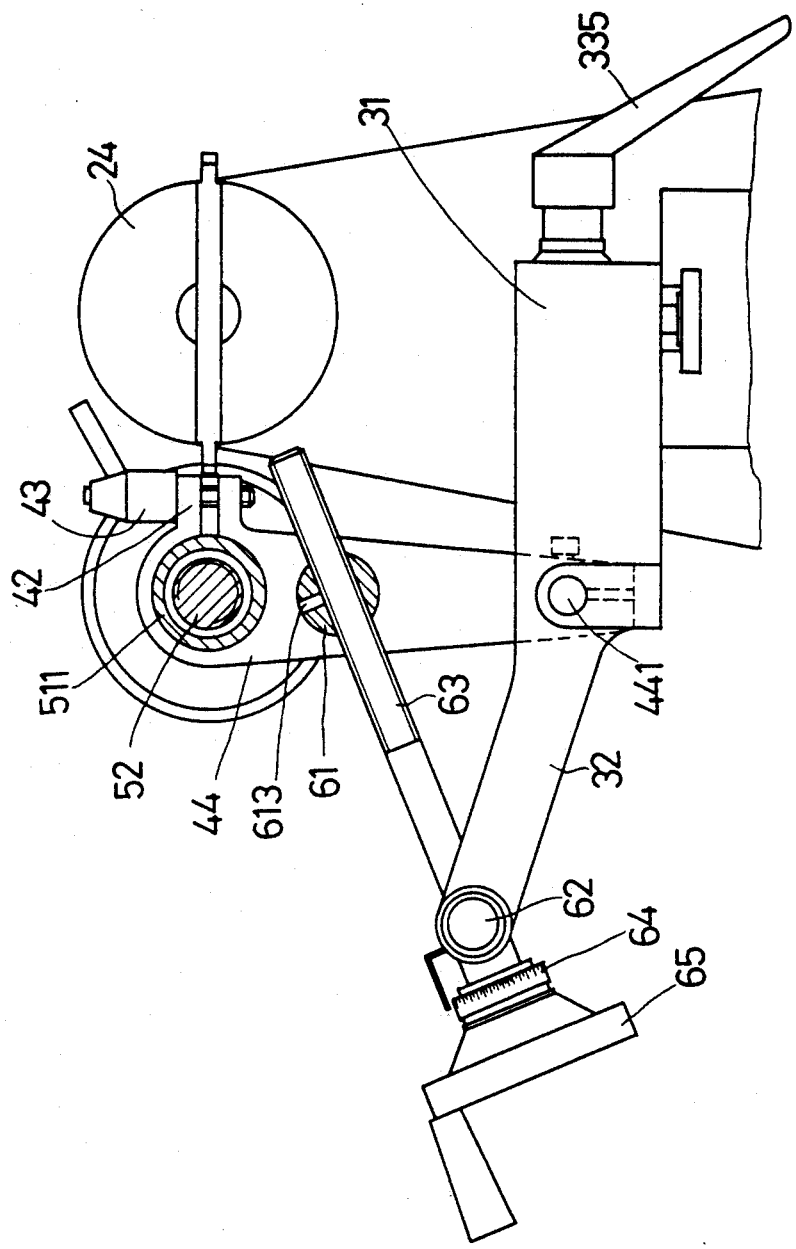
FIG. 5 shows a side view of the wood tapping machine of the present invention.
Figure 6:
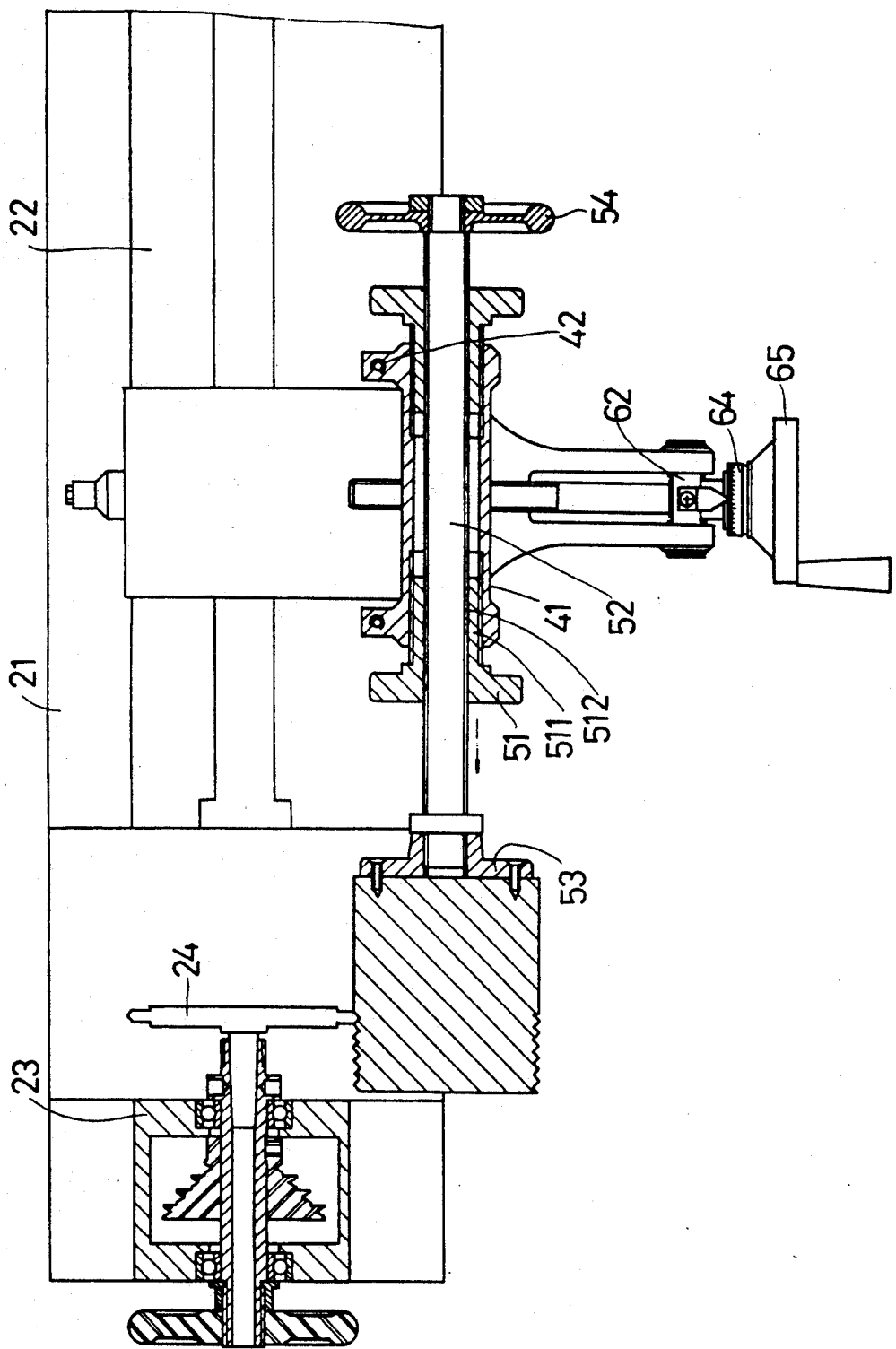
FIG. 6 shows a top view of the wood tapping machine of the present invention to illustrate how the present invention is used to form an external thread on a piece of wood.

Referring to FIGS. 3 and 5, when the preferred embodiment is in use, a piece of wood that is to be threaded is fixed in the chuck assembly (53) of the main shaft (52). The driving rod (60) is rotated by the rotation wheel (65) so as to determine how deep the thread should be formed on the piece of wood. The base member (31) is moved to an appropriate position along the guiding path (22) and is securely retained thereat by the locking unit (30) in a manner similar to that which was explained in the preceding paragraph. The main shaft (52) is rotated by the rotation wheel (54) so as to move the piece of wood toward the tapping rod (25) on which a tapping end (24) is mounted.

Note that the driving rod (60) rotates about its axis so as to permit the second arms (44) of the cylindrical casing (41) to swing in a first direction for a first predetermined angle and in a second direction opposite to the first direction for a second predetermined angle. The depth of threads that can be formed on a piece of wood are limited so as to correspond to the range from the first angle to second angles.

Figure 7:
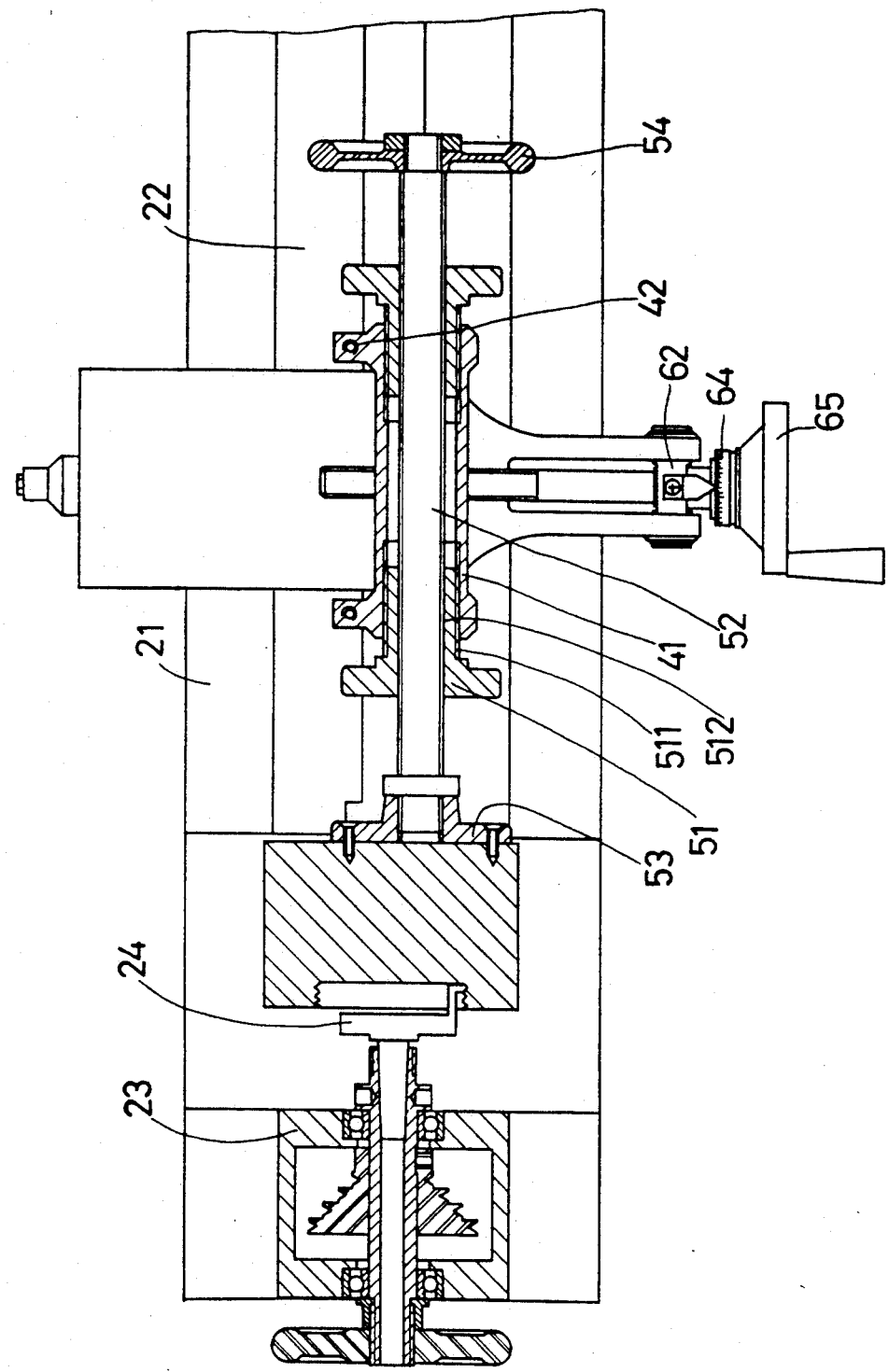
FIG. 7 shows a top view of the wood tapping machine of the present invention to illustrate how the present invention is used to form an internal thread in a piece of wood.
Figure 8:
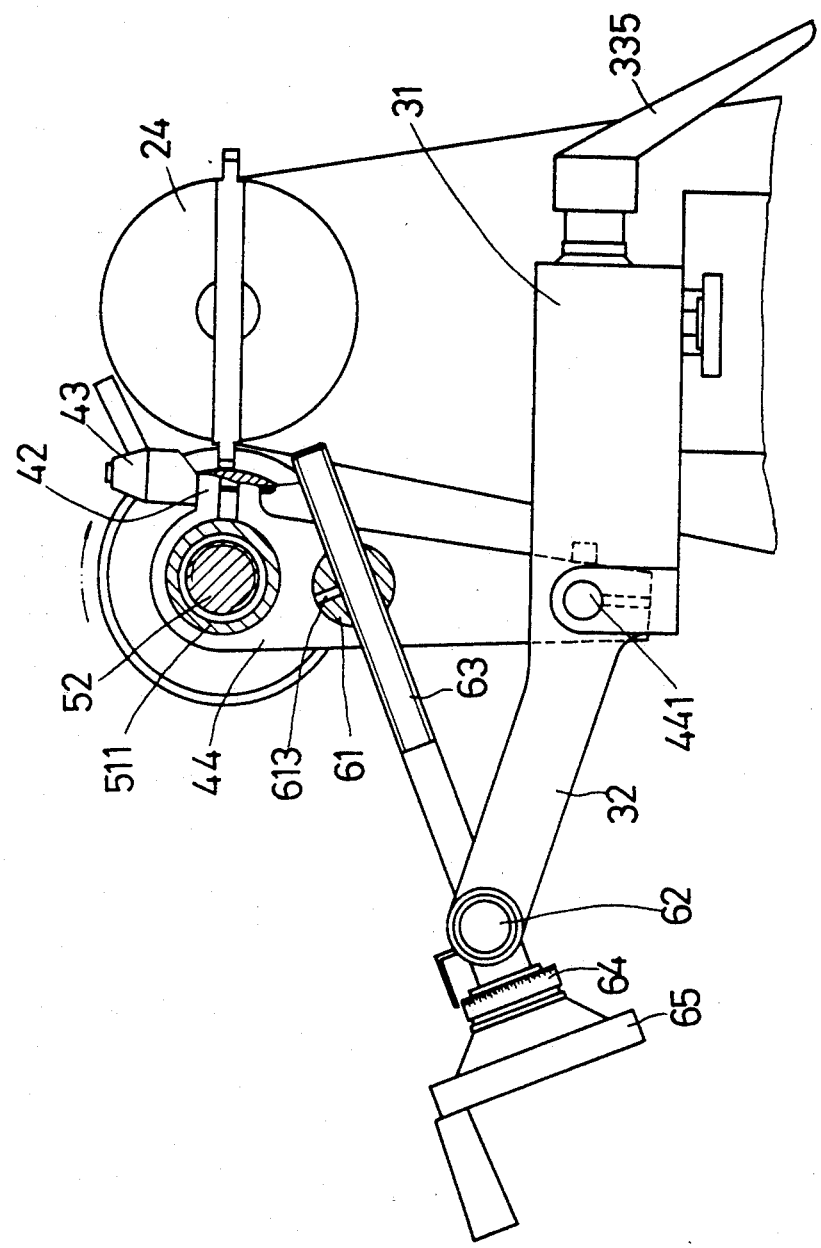
FIG. 8 shows the wood tapping machine of the present invention to illustrate how the depth of the thread being adjusted.

Referring to FIGS. 7 and 8, the piece of wood is fixed to the chuck assembly of the main shaft (52). The driving rod (60) is rotated about its axis so as to pivot the second arms (44) of the cylindrical casing (41) in a first direction wherein the piece of wood tightly abuts the tapping end (24) of the cutting device (23). Thus, threads with a substantial depth are formed on the piece of wood. In the event that the driving rod (60) is rotated about its axis so as to pivot the second arms of the cylindrical casing (41) in a second direction opposite to the first direction, wherein the piece of wood lightly abuts with the tapping end of the cutting device, threads with a shallow depth are formed on the piece of wood. The action is also the same when an internal thread is formed by means the wood tapping machine of the present invention. After the depth of threads is selected and the base member (31) is fixed along the guiding path, the rotation wheel (54) is gradually turned, so that the main shaft (52), which carries the piece of wood at one end thereof, is pushed toward the tapping end (25) of the cutting machine (23).

As explained and described above, it can be clearly understand that the wood tapping machine of the present invention can form external and internal threads on or in pieces of wood. Thus the pieces of wood can be assembled together by male-female connection to form furnitures without damaging said pieces of wood, which damages usually result when a nailing procedure is conducted. A distinguished feature which the conventional wood tapping machine fails to provide.

With the invention thus explained and described, it is obvious to those skilled in the art that various modifications and variations can be made without departing from the scope and spirit of the present invention. It is therefore intended that this invention be limited only in the extent of the appended claims.

I claim:

1. A wood tapping machine, comprising:
a machine body having a cutting device mounted thereon and including a tapping rod with a tapping end extending horizontally from said cutting device and a guiding path disposed on said machine body, said guiding path being parallel to and lower than said tapping rod of said cutting device;
a toolrest including a base member provided movably on said guiding path and having two spaced first arms extending from said base member in a direction transverse to said guiding path, a cylindrical casing with two opposed ends from which two second arms respectively extend and connect pivotally to said base member, a first connecting rod journalled between said first arms of said base member and having a central portion provided with a first threaded-bore, and a second connecting rod journalled between said two second arms adjacent to and parallel to the longitudinal axis of said cylindrical casing, said second connecting rod including an intermediate portion provided with a second threaded-bore extending therethrough in a direction transverse to the longitudinal axis of said second connecting rod;

a driving rod with a threaded portion extending threadedly through said first and second threaded-bores of said first and second connecting rods to retain the axis of said cylindrical casing above said base member and parallel to said tapping rod of said cutting device;

said cylindrical casing further having a first inner wall provided with an internal thread therein and a pair of guiding tubes respectively fixed in said opposed ends of said cylindrical casing, each of said guiding tubes having a second inner wall provided with an internal thread formed on said second inner wall;

a main shaft inserted rotatably through said cylindrical casing and including an external thread meshed with said internal thread of said guiding tubes, said main shaft having a first and second ends extending out from said pair of guiding tubes, said first end being nearer to said cutting device than said second end of said main shaft, said first end having a chuck assembly attached thereto, said chuck assembly being adapted to hold a workpiece, said second end of said main shaft having a rotatable wheel fixed thereon, rotation of said rotating wheel causing said externally threaded main shaft to move axially in said cylindrical casing; and means for securely positioning said base member along said guiding path;

whereby, when said driving rod rotates about its axis in a clockwise direction, said second arms of said cylindrical casing pivot relative to said base member in a first direction to a first angle, when said driving rod rotates about its axis in a counter clockwise direction, said second arms of said cylindrical casing pivot relative to said base member in a second direction opposite to said first direction to a second angle.

2. A wood tapping machine as defined in claim 1, wherein said wood tapping machine further includes a rotation indicator to indicate a rotational movement of said driving rod about the axis of said driving rod.

* * * * *